US010304408B2

(12) United States Patent
Yu et al.

(10) Patent No.: US 10,304,408 B2
(45) Date of Patent: May 28, 2019

(54) METHOD AND APPARATUS FOR CHANGING BACKGROUND COLOR OF TOOLBAR WITH DOMINANT COLOR OF PICTURE

(71) Applicant: GUANGZHOU SHENMA MOBILE INFORMATION TECHNOLOGY CO., LTD., Guangzhou, Guangdong Province (CN)

(72) Inventors: Zhichao Yu, Guangzhou (CN); Yuanfang Cui, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/645,789

(22) Filed: Jul. 10, 2017

(65) Prior Publication Data
US 2018/0018937 A1 Jan. 18, 2018

(30) Foreign Application Priority Data

Jul. 14, 2016 (CN) .......................... 2016 1 0562451

(51) Int. Cl.
*G06T 7/90* (2017.01)
*G09G 5/02* (2006.01)
(Continued)

(52) U.S. Cl.
CPC .............. *G09G 5/026* (2013.01); *G06T 7/90* (2017.01); *G09G 5/14* (2013.01); *G06F 3/04845* (2013.01);
(Continued)

(58) Field of Classification Search
CPC .. G09G 5/025; G09G 2320/0666; G06T 7/90; G06T 2200/24; G06F 3/0481; G06F 2203/04804
See application file for complete search history.

(56) References Cited

U.S. PATENT DOCUMENTS

2008/0307342 A1* 12/2008 Furches .................. G06T 11/00
715/764
2010/0053201 A1 3/2010 Klassen et al.
(Continued)

FOREIGN PATENT DOCUMENTS

CN 103164519 A 6/2013
CN 104268904 A 1/2015
(Continued)

OTHER PUBLICATIONS

"Android and the transparent status bar." raffaeu. Raffaue's blog. Apr. 11, 2015. http://blog.raffaeu.com/archive/2015/04/11/android-and-the-transparent-status-bar.aspx. Accessed via the Web on Feb. 15, 2018.*
(Continued)

*Primary Examiner* — Antonio A Caschera
(74) *Attorney, Agent, or Firm* — Sheppard Mullin Richter & Hampton LLP

(57) ABSTRACT

A computer-based method includes transparentizing a background color of a toolbar of a currently running application, extracting a dominant color of a picture currently displayed on a user interface of the application, and displaying the toolbar using a color based on the extracted dominant color as the background color of the toolbar, along with the picture on the user interface of the application, and when the displayed picture is moved up and down or left and right with a user operation, keeping the background color of the toolbar unchanged from the color based on the extracted dominant color when the displayed picture is not completely
(Continued)

moved out of an operation interface, and recovering the background color of the toolbar to a default color when the displayed picture is completely moved out of the operation interface and the operation interface does not have a picture or a color to display.

19 Claims, 5 Drawing Sheets

(51) Int. Cl.
    *G09G 5/14*     (2006.01)
    *G06F 3/0484*     (2013.01)

(52) U.S. Cl.
    CPC .............. *G06T 2200/24* (2013.01); *G06T 2207/10024* (2013.01); *G09G 2320/0666* (2013.01); *G09G 2320/08* (2013.01); *G09G 2340/06* (2013.01); *G09G 2354/00* (2013.01)

(56) References Cited

U.S. PATENT DOCUMENTS

| | | |
|---|---|---|
| 2012/0200586 A1 | 8/2012 | Lima et al. |
| 2014/0037200 A1 | 2/2014 | Phillips et al. |
| 2014/0075324 A1 | 3/2014 | Howard et al. |
| 2015/0170606 A1* | 6/2015 | Jureidini ............... G09G 5/026 345/592 |
| 2017/0228895 A1* | 8/2017 | Lee ....................... G06T 11/001 |

FOREIGN PATENT DOCUMENTS

| | | |
|---|---|---|
| CN | 104391691 A | 3/2015 |
| CN | 104731453 A | 6/2015 |
| CN | 104850395 A | 8/2015 |
| RU | 2352081 C2 | 4/2009 |

OTHER PUBLICATIONS

"Toolbar Animation with Android Design Support Library." Suleiman. Grafix Artist—Thoughts on App Design and Development. Jun. 3, 2015. http://blog.iamsuleiman.com/toolbar-animation-with-android-design-support-library/#dynamic-colors-with-palette-api. Accessed via the Web on Feb. 15, 2018.*

"Android changing Floating Action Button color." Post by Marko, Jul. 2, 2015. Stackoverflow. https://stackoverflow.com/questions/30969455/android-changing-floating-action-button-color. Accessed via the Web on Feb. 15, 2018.*

"How to Customize the Status Bar on Android (Without Rooting)." Riley J. Dennis. How-To Geek. Sep. 27, 2016. https://www.howtogeek.com/272459/how-to-customize-the-status-bar-on-android-without-rooting/ Accessed via web on Jun. 22, 2018.*

Office Action dated Jul. 13, 2018, issued in Russian Application No. 2017124659 (12 pages, including corresponding English translation).

Search Report dated Jul. 13, 2018, issued in Russian Application No. 2017124659 (5 pages, including corresponding English translation).

First Search dated Oct. 12, 2018, issued in related Chinese Application No. 201610562451.3 (2 pages).

First Office Action dated Oct. 29, 2018, issued in related Chinese Application No. 201610562451.3 (19 pages).

Second Office Action dated Dec. 11, 2018, issued in related Russian Application No. 2017124659 (11 pages).

* cited by examiner

METHOD AND APPARATUS FOR CHANGING BACKGROUND COLOR OF TOOLBAR WITH DOMINANT COLOR OF PICTURE

CROSS REFERENCE TO RELATED APPLICATION

This application claims the priority of Chinese Patent Application No. 201610562451.3 filed in the State Intellectual Property Office of the People's Republic of China on Jul. 14, 2016, the content of which is incorporated herein by reference in its entirety.

TECHNICAL FIELD

The present invention relates to the field of web page technologies, and in particular, to a method and an apparatus for changing a background color of a toolbar with a dominant color of a picture.

RELATED ART

With rapid development of intelligent terminals, various third-party applications (APPs) applied to the intelligent terminals are developed. A picture is displayed when an existing APP displays an interface on an intelligent terminal, especially when displaying a web page by a browser at a client site. Moreover, an APP usually has a toolbar to facilitate a user to implement various operations on the APP.

Currently, in the prior art, when various APPs are being developed, a technical solution of a fixed toolbar is used, and a color of the toolbar is also fixed. However, when an existing APP displays a big picture (that is, the picture occupies a full screen or almost occupies a full screen), or after a user changes a background color of an APP interface, since a background color of a toolbar of the APP is fixed, the harmony and correlation of interface display are affected. Consequently, the overall look of the display interface is relatively rigid, it feels like that the display interface is cut apart, and user experiences are poor.

SUMMARY

An objective of the present invention is to provide a method and an apparatus for changing a background color of a toolbar with a dominant color of a picture, so as to resolve the foregoing problem.

According to a first aspect of the present invention, an embodiment of the present invention provides a method for changing a background color of a toolbar with a dominant color of a picture, including:

transparentizing a background color of a toolbar of a currently running application;

extracting a dominant color of a picture currently displayed on a user interface of the application; and using the extracted color as the background color of the toolbar, and displaying the extracted color.

Preferably, the method further includes: automatically changing a button color of the toolbar according to the changed background color of the toolbar.

Preferably, the button color of the toolbar is automatically changed by using a color-to-grayscale method, where the color-to-grayscale method includes:

using a formula Gray=R*0.299+G*0.587+B*0.114, where Gray is a grayscale value, R is a red color value of the extracted dominant color of the picture, G is a green color value of the extracted dominant color of the picture, and B is a blue color value of the extracted dominant color of the picture; and converting the RGB color values of the extracted dominant color of the picture to a grayscale value, where when the grayscale value ranges from 0 to 0.5, the button color of the toolbar is changed to black, and when the grayscale value ranges from 0.5 to 1, the button color of the toolbar is changed to white.

Preferably, the method further includes: when the displayed picture is moved up and down or left and right with a user operation, keeping the background color of the toolbar unchanged when the displayed picture is not completely moved out of an operation interface; and recovering the background color of the toolbar to a default color when the displayed picture is completely moved out of the operation interface and the operation interface does not have a picture or a color to display.

Preferably, the step of extracting a dominant color of a currently displayed picture includes:

a picture obtaining step for obtaining the currently displayed picture, where the picture includes multiple display units;

a color classification step for performing, in a first color space, classification processing on each display unit included in the picture so as to obtain several color categories by classifying display units having same color characteristics into a same color category, and calculating a quantity of display units corresponding to each color category;

a color-weight calculation step for converting each color category from the first color space to a second color space, obtaining a value of each color category in each dimension of the second color space, determining a weighting function of each dimension of the second color space according to a factor that is in a display requirement and that corresponds to each dimension of the second color space, and calculating a weight of each color category according to the value of each color category in each dimension of the second color space and the weighting function of each dimension; and a dominant-color extraction step for calculating color values according to the quantity of display units corresponding to each color category and the weight of the color category, and extracting a color category having a highest color value to serve as the dominant color of the picture.

Preferably, the color-weight calculation step includes:

converting N color categories obtained after classification from the first color space to the second color space having M dimensions to obtain a value of each color category in the second color space, where a value of an $i^{th}$ color category in a $j^{th}$ dimension of the second color space is $P_{ij}$ (i=1, ..., N; j=1, ..., M;

configuring the weighting function of each dimension of the second color space according to the factor that is in the display requirement and that corresponds to each dimension of the second color space, where a weighting function of the $j^{th}$ dimension is $F(x_j)$ (j=1, ..., N); and calculating the weight of each color category according to the value and the weighting function of each color category in the second color space, where a weight $W_i$ of the $i^{th}$ category of color is $$W_i = \sum_{j=1}^{M} F(P_{ij}) + C,$$

where C is a constant except 0.

Preferably, the weighting function is set so that a dimension with a higher correlation with a factor in the display requirement, associates with a larger result value calculated by the weighting function of the dimension.

Preferably, the first color space is an RGB space, and the second color space is an HSV space.

Preferably, in the color-weight calculation step, when a factor corresponding to a saturation rate of the HSV space in the display requirement is making a displayed color brighter, a weighting function of the saturation rate is set to $F(S)=(S/2^A)^2$, where S is a value of the saturation rate, and A is a positive integer.

Preferably, in the color-weight calculation step, when a factor corresponding to lightness of the HSV space in the display requirement is avoiding an extreme color unfavorable to text display, a weighting function of the lightness is set to:

$$F(V) = \begin{cases} V & V < 2^{p2-1} \\ 2^{p2-1} & 2^{p2-1} \leq V \leq 2^{p2-2} \times 3 \\ 2^{p2+1} - 2 \times V & V > 2^{p2-1} \end{cases},$$

where V is a value of the lightness, and a value of p2 is obtained according to a maximum value $2^{p2}-1$ of the value V of the lightness of the HSV space.

Preferably, the color classification step further includes: performing, by using the following formula, downsampling on the display units included in the picture:

$$[S'_1, S'_2, \ldots S'_T] = \left[\left\lfloor \frac{S_1}{2^{q1}} \right\rfloor, \left\lfloor \frac{S_2}{2^{q1}} \right\rfloor, \ldots, \left\lfloor \frac{S_T}{2^{q1}} \right\rfloor\right],$$

and classifying display units that are obtained after downsampling and that have same $[S'_1, S'_2, \ldots S'_T]$ into a same color category, where T is a quantity of dimensions of the first color space $[S_1, \ldots, S_T]$ is a value of a single display unit in the first color space, q1 is an integer greater than 0 and less than p, and a value of p is obtained according to a known maximum value $2^p-1$ of each dimension in the first color space.

Preferably, in the dominant-color extraction step, a color value of each color category is obtained by multiplying the quantity of display units corresponding to each color category by the weight.

Preferably, the dominant-color extraction step includes: extracting an intermediate color value of a color category that has a largest color value to serve as the dominant color of the picture.

Preferably, before the color classification step, the method further includes: a step of scaling down the picture, in order to reduce side pixels of the picture to a proper value.

Preferably, the method further includes: a step of matching a template to determine a final dominant color for matching the extracted dominant color of the picture with a pre-configured template color, and selecting a template color nearest to the dominant color of the picture as the final dominant color of the picture.

According to a second aspect of the present invention, an embodiment of the present invention provides an apparatus for changing a background color of a toolbar with a dominant color of a picture, including:

a module for transparentizing a background color of a toolbar, configured to transparentize a background color of a toolbar of a currently running application;

a module for extracting a dominant color of a picture, configured to extract a dominant color of a picture currently displayed on a user interface of the application; and a module for changing a background color of a toolbar, configured to: use the extracted color as the background color of the toolbar, and display the extracted color.

Preferably, the apparatus further includes: a module for changing a button color of a toolbar, configured to automatically change a button color of the toolbar according to the changed background color of the toolbar.

Preferably, the button color of the toolbar is automatically changed by using a color-to-grayscale method, where the color-to-grayscale method includes:

using a formula Gray=R*0.299+G*0.587+B*0.114, where Gray is a grayscale value, R is a red color value of the extracted dominant color of the picture, G is a green color value of the extracted dominant color of the picture, and B is a blue color value of the extracted dominant color of the picture; and converting the RGB color values of the extracted dominant color of the picture to a grayscale value, where when the grayscale value ranges from 0 to 0.5, the button color of the toolbar is changed to black, and when the grayscale value ranges from 0.5 to 1, the button color of the toolbar is changed to white.

Preferably, the apparatus further includes: a module for recovering a background color of a toolbar, configured to recover the background color of the toolbar to a default color when the displayed picture is completely moved out of an operation interface and the operation interface does not have a picture or a color to display.

Preferably, the module for extracting a dominant color of a picture includes:

a picture obtaining module, configured to obtain the currently displayed picture, where the picture includes multiple display units;

a color classification module, configured to: perform, in a first color space, classification processing on each display unit included in the picture so as to obtain several color categories by classifying display units having same color characteristics into a same color category, and calculate a quantity of display units corresponding to each color category;

a color-weight calculation module, configured to: convert each color category from the first color space to a second color space, obtain a value of each color category in each dimension of the second color space, determine a weighting function of each dimension of the second color space according to a factor that is in a display requirement and that corresponds to each dimension of the second color space, and calculate a weight of each color category according to the value of each color category in each dimension of the second color space and the weighting function of each dimension; and a dominant-color extraction module, configured to: calculate color values according to the quantity of display units corresponding to each color category and the weight of the color category, and extract a color category having a highest color value to serve as the dominant color of the picture.

Preferably, the color-weight calculation module is configured to:

convert N color categories obtained after classification from the first color space to the second color space having M dimensions to obtain a value of each color category in the second color space, where a value of an $i^{th}$ color category in a $j^{th}$ dimension of the second color space is $P_{ij}$ (i=1, . . . ; j=1, . . . , M);

set the weighting function of each dimension of the second color space according to the factor that is in the display requirement and that corresponds to each dimension of the second color space, where a weighting function of the $j^{th}$ dimension is $F(x_j)$ (j=1 . . . , N); and calculate the weight of each color category according to the value and the weighting function of each color category in the second color space, where a weight i of the $W_i^{th}$ category of color is $$W_i = \sum_{j=1}^{M} F(P_{ij}) + C,$$

where C is a constant except 0.

Preferably, the color-weight calculation module is configured to set the weighting function so that a dimension having a higher correlation with a factor in the display requirement indicates a larger result value calculated by the weighting function of the dimension.

Preferably, the first color space is an RGB space, and the second color space is an HSV space.

Preferably, the color-weight calculation module is configured to: when a factor corresponding to a saturation rate of the HSV space in the display requirement is making a displayed color brighter, set a weighting function of the saturation rate to $F(S)=(S/2^A)^2$, where S is a value of the saturation rate, and A is a positive integer.

Preferably, the color-weight calculation module is configured to: when a factor corresponding to lightness of the HSV space in the display requirement is avoiding an extreme color unfavorable to text display, set a weighting function of the lightness to:

$$F(V) = \begin{cases} V & V < 2^{p2-1} \\ 2^{p2-1} & 2^{p2-1} \leq V \leq 2^{p2-2} \times 3, \\ 2^{p2+1} - 2 \times V & V > 2^{p2-1} \end{cases}$$

where V is a value of the lightness, and a value of p2 is obtained according to a maximum value $2^{p2}-1$ of the value V of the lightness of the HSV space.

Preferably, the color classification module is configured to perform, by using the following formula, downsampling on the display units included in the picture:

$$[S'_1, S'_2, \ldots S'_T] = \left[\left\lfloor \frac{S_1}{2^{q1}} \right\rfloor, \left\lfloor \frac{S_2}{2^{q1}} \right\rfloor, \ldots, \left\lfloor \frac{S_T}{2^{q1}} \right\rfloor\right],$$

and classify display units that are obtained after downsampling and that have same $[S'_1, S'_2, \ldots S'_T]$ into a same color category, where T is a quantity of dimensions of the first color space, $[S_1, \ldots, S_T]$ is a value of a single display unit in the first color space, q1 is an integer greater than 0 and less than p, and a value of p is obtained according to a known maximum value $2^p-1$ of each dimension in the first color space.

Preferably, the dominant-color extraction module is configured to multiply the quantity of display units corresponding to each color category by the weight to obtain a color value of each color category.

Preferably, the dominant-color extraction module is configured to extract an intermediate color value of a color category that has a largest color value to serve as the dominant color of the picture.

Preferably, the apparatus further includes a picture downscaling module, configured to reduce side pixels of the picture to a proper value.

Preferably, the apparatus further includes: a module for matching a template to determine a final dominant color, configured to: match the extracted dominant color of the picture with a pre-configured template color, and select a template color nearest to the dominant color of the picture as the final dominant color of the picture.

According to a third aspect of the present invention, an embodiment of the present invention provides a method for changing a background color of an element bar with a dominant color of a picture, including:

transparentizing a background color of an element bar of a currently running application;

extracting a dominant color of a picture currently displayed on a user interface of the application; and using the extracted color as the background color of the element bar and displaying the extracted color.

Preferably, the method further includes: automatically changing a button color of the element bar according to the changed background color of the element bar.

Preferably, the step of extracting a dominant color of a currently displayed picture includes:

a picture obtaining step for obtaining the currently displayed picture, where the picture includes multiple display units;

a color classification step for performing, in a first color space, classification processing on each display unit included in the picture so as to obtain several color categories by classifying display units having same color characteristics into a same color category, and calculating a quantity of display units corresponding to each color category;

a color-weight calculation step for converting each color category from the first color space to a second color space, obtaining a value of each color category in each dimension of the second color space, determining a weighting function of each dimension of the second color space according to a factor that is in a display requirement and that corresponds to each dimension of the second color space, and calculating a weight of each color category according to the value of each color category in each dimension of the second color space and the weighting function of each dimension; and a dominant-color extraction step for calculating color values according to the quantity of display units corresponding to each color category and the weight of the color category, and extracting a color category having a highest color value to serve as the dominant color of the picture.

Preferably, the element bar includes: a title bar, a menu bar, an address bar, a status bar, a taskbar, or a browsing bar.

According to a fourth aspect of the present invention, an embodiment of the present invention provides an apparatus for changing a background color of an element bar with a dominant color of a picture, including:

a module for transparentizing a background color of an element bar, configured to transparentize a background color of an element bar of a currently running application;

a module for extracting a dominant color of a picture, configured to extract a dominant color of a picture currently displayed on a user interface of the application; and a module for changing a background color of an element bar, configured to use the extracted color as the background color of the element bar and display the extracted color.

Preferably, the apparatus further includes: a module for changing a button color of an element bar, configured to automatically change a button color of the element bar according to the changed background color of the element bar.

Preferably, the element bar includes: a title bar, a menu bar, an address bar, a status bar, a taskbar, or a browsing bar.

By means of the method and the apparatus for changing a background color of a toolbar with a dominant color of a picture described in the present invention, an extracted dominant color of a picture may be applied to a conventionally fixed background color of a toolbar, so that a color of the toolbar may be adaptively adjusted according to result content displayed on a screen. Therefore, an interface match is more harmonious and beautiful. Overall harmony and a subject correlation of the interface are enhanced. Disadvantages of a relatively rigid overall look and a relatively strong sense of being cut apart of the display interface in the prior art are avoided. An effect of interface immersive experience is improved, and the interface is more visually harmonious.

BRIEF DESCRIPTION OF THE DRAWINGS

The present invention will become more fully understood from the detailed description given herein below for illustration only, and thus are not limitative of the present invention, and where.

DETAILED DESCRIPTION

The technical solutions in the embodiments of the present invention are clearly and completely described below with reference to the accompanying drawings in the embodiments of the present invention. Apparently, the described embodiments are merely a part rather than all of the embodiments of the present invention. Usually, components that are of the embodiments of the present invention and that are described and shown in the accompanying drawings may be arranged and designed by using various different configurations. Therefore, the following detailed descriptions about the embodiments of the present invention provided in the accompanying drawings are not intended to limit the scope of the present invention protected by the claims, but are merely used to represent selected embodiments of the present invention. All other embodiments obtained by a person of ordinary skill in the art based on the embodiments of the present invention without creative efforts shall fall within the protection scope of the present invention.

The technical solutions in the embodiments of the present invention are clearly and completely described below with reference to the accompanying drawings and specific embodiments of the present invention.

Figure 1:
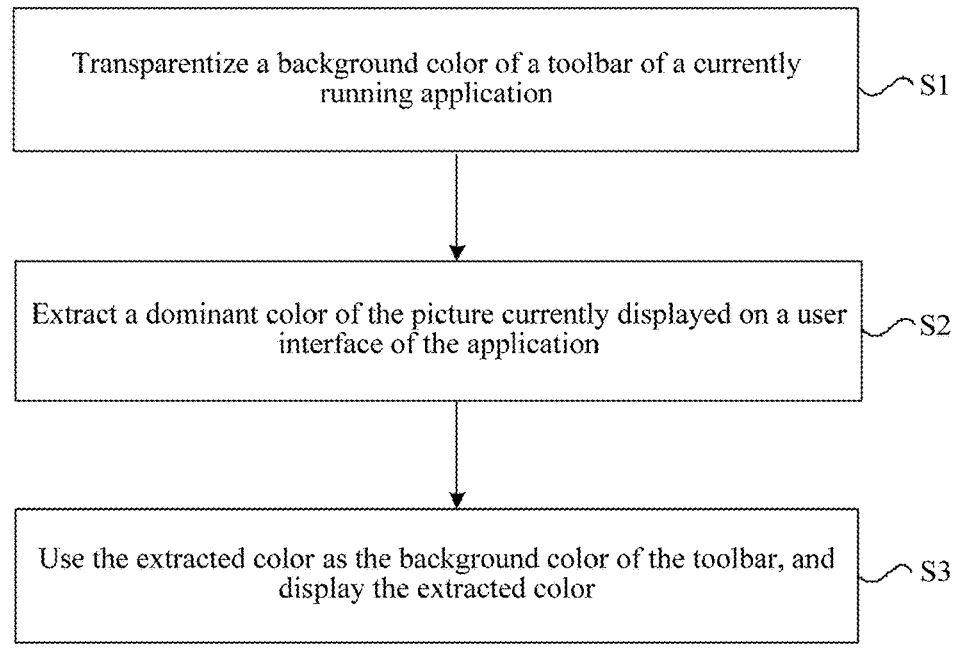
FIG. 1 is a schematic flowchart of a method for changing a background color of a toolbar with a dominant color of a picture according to the present invention.

FIG. 1 is a schematic flowchart of a method for changing a background color of a toolbar with a dominant color of a picture according to the present invention. As shown in FIG. 1, the method for changing a background color of a toolbar with a dominant color of a picture in the present invention includes the following steps.

Step 1: Transparentize a Background Color of a Toolbar of a Currently Running Application.

As mentioned in the related art, a background color of a toolbar of an existing APP at a client site is fixed. Therefore, when the existing APP at a client site displays a big picture in a full screen or almost in a full screen, colors displayed on a screen of an intelligent terminal look rigid, and have a relatively strong sense of being cut apart. Therefore, the background color of the toolbar of a currently running application needs to be transparentized first, so that a color of the picture that is blocked by the toolbar and that is currently displayed on the screen becomes visible. In different program language environments, a related parameter of a corresponding function is set to transparentize the background color of the toolbar. A person skilled in the art knows how to set the parameter, and details are not described herein.

Step 2: Extract a Dominant Color of the Picture Currently Displayed on a User Interface of the Application.

There are many methods for extracting a dominant color of a picture. For example, the patent No. CN101714257A disclosed on May 26, 2010 discloses an extraction and structured description method for a main color feature of a picture; the patent No. CN102592272A disclosed on Jul. 18, 2012 discloses a method and an apparatus for extracting a dominant tone of a picture; the patent No. CN104123736A disclosed on Oct. 29, 2014 discloses a method and an apparatus for obtaining a main color system of a picture; and the patent No. CN104268904A disclosed on Jan. 7, 2015 discloses a method and an apparatus for extracting a dominant color of a picture, and more examples are not listed herein. In addition to the method for extracting a dominant color of a picture known in the art, the present invention further provides a new method for extracting a dominant color of a picture. A specific implementation method for extracting a dominant color of a picture provided in the present invention is described in detail below.

Step 3: Use the Extracted Color as the Background Color of the Toolbar, and Display the Extracted Color.

A person skilled in the art knows that various colors displayed on a screen of an intelligent terminal are implemented by setting, for example, different RGB color values or combinations thereof. Therefore, the color extracted in step 2 may be represented by a specific color value. The background color value of the toolbar is replaced with the extracted color value, so that the extracted color is used as the background color of the toolbar and is displayed.

When the background color of the toolbar is changed, an original button color may not be consistent with the background color of the toolbar, that is, in the new background color of the toolbar, a button may not be clearly displayed. For example, the original button color is black, and the background color of the toolbar is in a dark-colored area. Therefore, in a preferable solution, the method for changing a background color of a toolbar with a dominant color of a picture may further include:

Step 4: Automatically Change a Button Color of the Toolbar According to the Changed Background Color of the Toolbar.

The button color of the toolbar is automatically changed according to the changed background color of the toolbar by using a color-to-grayscale method. The color-to-grayscale method includes:

using a formula Gray=R*0.299+G*0.587+B*0.114, where Gray is a grayscale value, R is a red color value of the extracted dominant color of the picture, G is a green color value of the extracted dominant color of the picture, and B is a blue color value of the extracted dominant color of the picture; and converting the RGB color values of the extracted dominant color of the picture to a grayscale value, where when the grayscale value ranges from 0 to 0.5, the button color of the toolbar is automatically changed to black, and when the grayscale value ranges from 0.5 to 1, the button color of the toolbar is automatically changed to white. Specifically, the formula Gray=R*0.299+G*0.587+B*0.114 is a famous psychology formula known in the field. After the RGB color values are converted to the grayscale value by using the foregoing formula, if the grayscale value ranges from 0 to 0.5, it indicates that the dominant color of the picture currently displayed on the screen is in a light area. Therefore, the button color of the toolbar is changed to black. When the grayscale value ranges from 0.5 to 1, it indicates that the dominant color of the picture currently displayed on the screen is in a dark area. Therefore, the button color of the toolbar should be changed to white.

In addition, in a preferable embodiment, when a user operates an APP at a client site installed on an intelligent terminal, displayed content may be scrolled up and down or left and right, paged up or down, switched, or the like. For example, when browsing a web page by using a browser installed on the intelligent terminal, a user slides the screen with a finger to scroll, page up or down, or switch displayed web page content. Several scenarios may occur: (1) The user slightly slides the screen with a finger to slightly move the displayed picture. That is, although the picture displayed on the screen is moved, the picture is still completely displayed in a display area of the screen. The dominant color of the picture has been extracted and is used as the background color of the toolbar for display. In this case, the background color of the toolbar remains unchanged. (2) The user slides the screen to scroll the displayed picture on the screen, and in the end, a text or a blank page is displayed on the screen instead of the picture. In this case, the background color of the toolbar is recovered to a default color. (3) The user slides the screen with a finger to scroll the displayed picture on the screen, and ends with a new picture displayed on the screen, the background color of the toolbar is adaptively changed. That is, steps 1 to 3 or steps 1 to 4 of the foregoing method are performed to change the background color of the toolbar to a new color.

In addition, in a preferable embodiment, if a user sets a background color of an running APP at a client site, for example, the user sets a background color of a browser installed on an intelligent terminal to green, and a web page opened on the browser displays a text content and the background color is green. A background color of a toolbar of the browser may also be adaptively changed by running the foregoing method.

In short, after step 3 or step 4 of the method for changing a background color of a toolbar with a dominant color of a picture is finished, the method further includes:

when the displayed picture is moved up and down or left and right with a user operation, keeping the background color of the toolbar unchanged when the displayed picture is not completely moved out of an operation interface; and recovering the background color of the toolbar to a default color when the displayed picture is completely moved out of the operation interface and the operation interface does not have a picture or a color to display.

It should be noted that the currently displayed picture described in this specification is a main big picture that is displayed on the screen of the intelligent terminal and that occupies a dominant position. That is, the displayed picture occupies all or most of the display area of the screen.

By means of the method for changing a background color of a toolbar with a dominant color of a picture described in the present invention, an extracted dominant color of a picture may be applied to a conventionally fixed background color of a toolbar, so that a color of the toolbar may be adaptively adjusted according to result content displayed on a screen. Therefore, an interface match is more harmonious and beautiful. The overall harmony and subject correlation of the interface are enhanced. Disadvantages of a relatively rigid overall look and a relatively strong sense of being cut apart of the display interface in the prior art are avoided. An effect of interface immersive experience is improved, and the interface is more visually harmonious.

Figure 7:
FIG. 7 is an example of a screenshot of screen display in the prior art.
Figure 8:
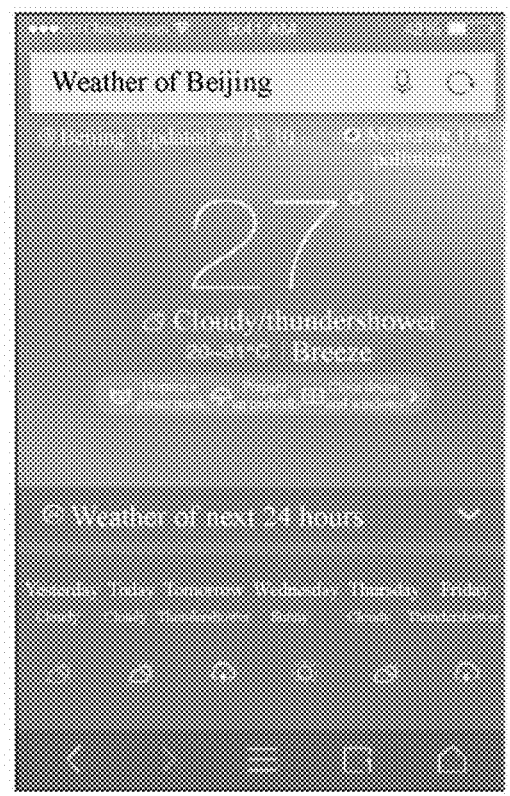
FIG. 8 is an example of a screenshot of screen display after a method or an apparatus in the present invention is used.

For example, FIG. 7 is an example of a screenshot of screen display in the prior art. The screenshot displayed in FIG. 7 is a page of weather forecast browsed by using a browser at a client site on an intelligent terminal. As can be seen, a color of a picture displayed on the page is mainly blue, but a background color of a bottom toolbar of the browser is always white. Consequently, an overall look of the display interface is relatively rigid, and it feels like that the display interface is cut apart. FIG. 8 is an example of a screenshot of screen display after the method or the apparatus in the present invention is used. As can be seen from a page of weather forecast shown in FIG. 8, when a color of a picture displayed on the page is mainly blue, a background color of a bottom toolbar is automatically changed to blue. The background color of the bottom toolbar is consistent with a style of the color of the picture of the page displayed on the screen. An interface is more visually harmonious. The overall harmony and subject correlation of the interface are enhanced.

In addition, although the method for changing a background color of a toolbar with a dominant color of a picture is described in multiple embodiments described above, a person skilled in the art knows that the method is not limited to a background color of a toolbar. Background colors of other element bars may also be changed with a dominant color of a picture by using the method provided in the embodiments of the present invention. The element bar includes but is not limited to: a title bar, a menu bar, an address bar, a status bar, a taskbar, a browsing bar, or the like.

Therefore, an embodiment of the present invention further provides a method for changing a background color of an element bar with a dominant color of a picture, including:

transparentizing a background color of an element bar of a currently running application;

extracting a dominant color of a picture currently displayed on a user interface of the application; and using the extracted color as the background color of the element bar and displaying the extracted color.

Preferably, the method further includes: automatically changing a button color of the element bar according to the changed background color of the element bar. The element bar includes: a title bar, a menu bar, a toolbar, an address bar, a status bar, a taskbar, or a browsing bar.

In addition, any combination solution of multiple embodiments described above is also applicable to this embodiment.

Figure 2:
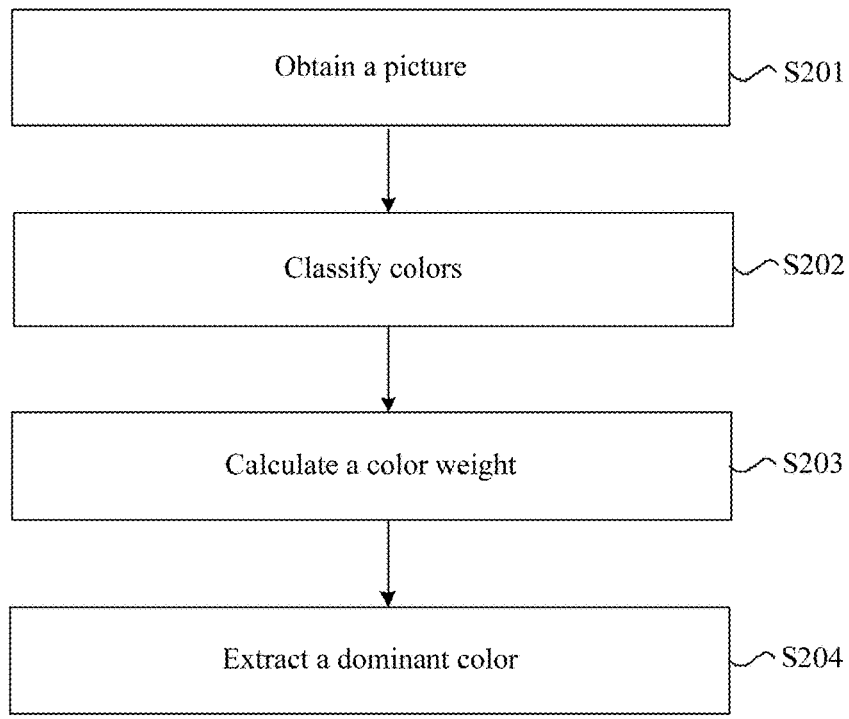
FIG. 2 is a flowchart of a method for extracting a dominant color of a picture according to an embodiment of the present invention.

In addition, as described in the foregoing step 2, the dominant color of the currently displayed picture may be extracted by using multiple methods. FIG. 2 is a flowchart of a method for extracting a dominant color of a picture according to an embodiment of the present invention. As shown in FIG. 2, in a preferable embodiment, the method for extracting a dominant color of a picture provided in the present invention includes:

a picture obtaining step 201 for obtaining the currently displayed picture, where the picture includes multiple display units;

a color classification step 202 for performing, in first color space, classification processing on each display unit included in the picture so as to obtain several color categories by classifying display units having same color characteristics into a same color category, and calculating a quantity of display units corresponding to each color category;

a color-weight calculation step 203 for converting each color category from the first color space to second color space, obtaining a value of each color category in each dimension of the second color space, determining a weighting function of each dimension of the second color space according to a factor that is in a display requirement and that corresponds to each dimension of the second color space, and calculating a weight of each color category according to the value of each color category in each dimension of the second color space and the weighting function of each dimension; and a dominant-color extraction step 204 for calculating color values according to the quantity of display units corresponding to each color category and the weight of the color category, and extracting a color category having a highest color value to serve as the dominant color of the picture.

In addition, in a preferable embodiment, before the color classification step, the method further includes: a step of scaling down the picture, in order to reduce side pixels of the picture to a proper value.

In addition, in another preferable embodiment, in addition to the steps described above, the method for extracting a dominant color of a picture in the present invention further includes: a step of matching a template for matching the extracted dominant color of the picture with a pre-configured template color, and selecting a template color nearest to the dominant color of the picture as the final dominant color of the picture.

Figure 3:
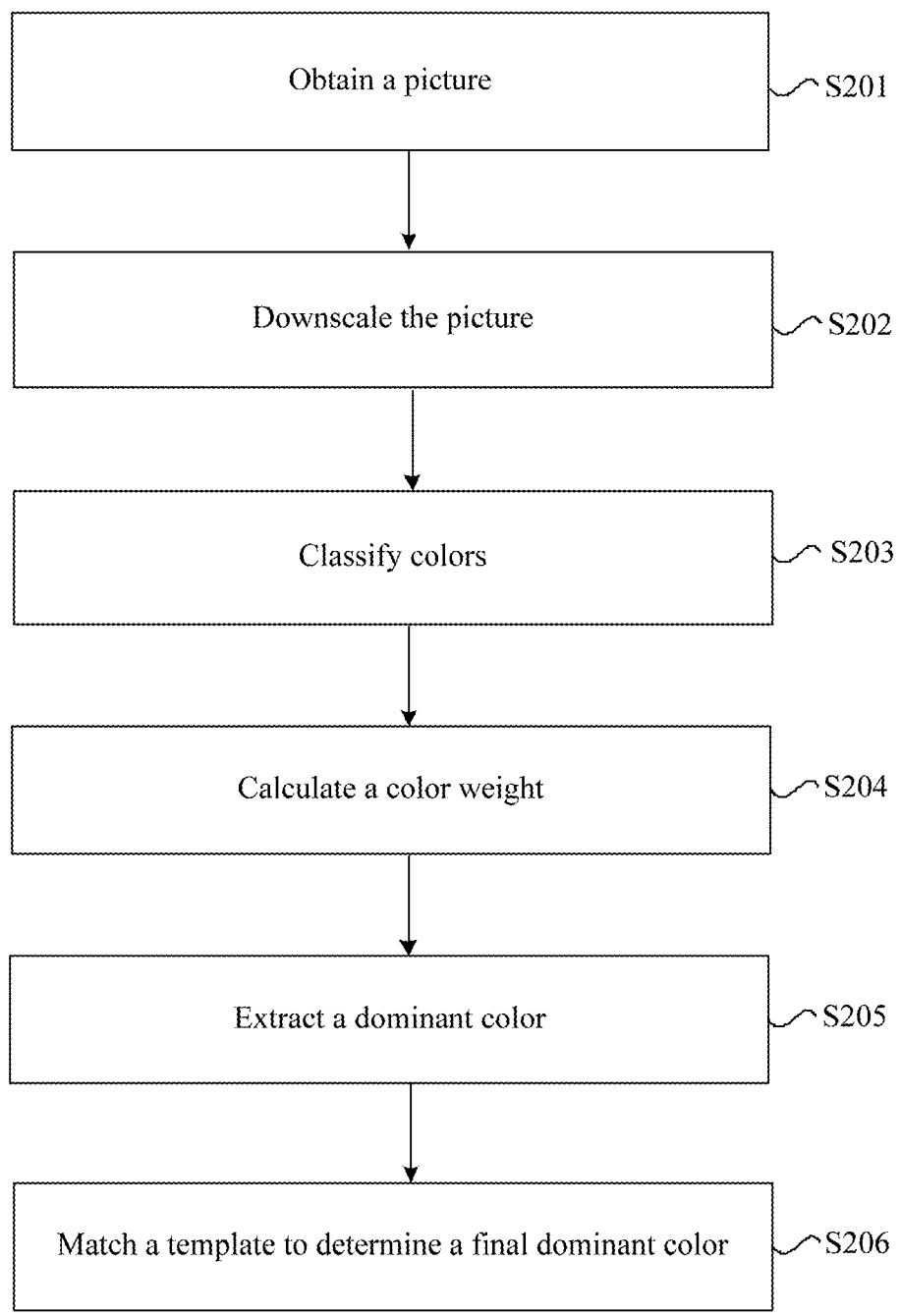
FIG. 3 is a flowchart of a method for extracting a dominant color of a picture according to another embodiment of the present invention.

FIG. 3 is a flowchart of a method for extracting a dominant color of a picture according to another embodiment of the present invention. FIG. 3 shows the method for extracting a dominant color of a picture including the two foregoing preferable embodiments. However, a person skilled in the art knows after reading this specification of the present invention that the two preferable embodiments may separately and individually be in the method embodiment shown in FIG. 2, or may be in the method embodiment shown in FIG. 2 together.

Details of the foregoing steps are described below with reference to FIG. 3.

First, in step S201, a currently displayed picture is obtained, where the picture includes multiple display units.

The currently displayed picture is usually a main picture displayed when web page content is browsed on a web page, or a main picture displayed on an interface of a third-party application, for example, a mobile phone application.

The picture includes multiple display units. The display units may be minimum pixel units displayed in the picture, may be minimum arrays of picture data, or may be display units of picture processing that are divided according to an application need. For example, minimum display areas of the picture that can support an operation are divided according to an operation capability supported by an apparatus for implementing the method for extracting a dominant color of a picture.

Subsequently, optionally, step S202 is performed to perform the step of scaling down the picture for reducing side pixels of the picture to a proper value. Step S202 is preferable, and implementation of the method for extracting a dominant color of a picture is not affected without performing this step.

If a size of the currently displayed picture is relatively big or a processing capability of the apparatus for implementing the method for extracting a dominant color of a picture is limited, the side pixels of the picture whose dominant color is to be extracted may be reduced to a proper value by using step S202, so that the size of the picture is reduced to a size suitable for processing or a size suitable for the processing capability of the apparatus for implementing the method for extracting a dominant color of a picture. The proper value may be selected according to an application need or practice experience. In generally application, it is relatively suitable to reduce the side of the picture to 200 pixels.

If the size of the picture whose dominant color is to be extracted is suitable or the processing capability of the apparatus of the method for extracting a dominant color of a picture is not limited, step S203 is directly performed after step S201, where S203 is the color classification step for performing, in the first color space, classification processing on each display unit included in the picture so as to obtain several color categories by classifying display units having same color characteristics into a same color category, and calculating a quantity of display units corresponding to each color category.

The first color space may be an RGB space, where R represents red, G represents green, and B represents blue. In the RGB space, three colors, red (R), green (G), and blue (B), are changed or overlapped to obtain various colors. Therefore, in the RGB space, which is three-dimensional space, various colors that can be seen by humans may be represented by a combination of different values of three dimensions R, G, and B. The first color space may be other color space in which various colors that can be seen by humans may be represented by using a combination of values of dimensions of the space, for example, LAB space. In the LAB space, L represents lightness, (which ranges from 0 to 100), A represents a range from red to green (which ranges from 127 to −128, where 127 corresponds to red, and −128 corresponds to green), and B represents a range from yellow to blue (which ranges from 127 to −128, where 127 corresponds to yellow, and −128 corresponds to blue). All colors may be formed in the LAB space by changing a combination of the three values L, A, and B.

The color characteristic may be a characteristic used to independently represent a common point of colors of multiple display units in the first color space, may be a value range of a dimension in the first color space, or may be a combination including at least value ranges of any two dimensions in the first color space, or another equivalent characteristic.

For example, the first color space is the RGB space. Display units satisfying a color characteristic that a value of R ranges from 16 to 31 may be classified into a same color category, and display units satisfying a color characteristic that a value of R ranges from 0 to 15 may be classified into another color category. By analogy, the display units included in the picture are classified according to the color characteristic of the value of the dimension R. Alternatively, classification is performed according to a color characteristic of values of two dimensions R and G. For example, display units satisfying a color characteristic that the values of both R and G range from 16 to 31 are classified into a same color category, display units satisfying a color characteristic that the values of both R and G range from 0 to 15 are classified into another color category, and so on, to finish classification. Alternatively, classification is performed simultaneously according to a color characteristic of values of three dimensions R, G, and B. For example, display units satisfying a color characteristic that values of R, G, and B range from 16 to 31 are classified into a same color category, display units satisfying a color characteristic that the values of R, G, and B range from 0 to 15 are classified into another color category, and so on, to finish classification.

Therefore, when the first color space is the RGB space, the color classification step of step S203 is specifically performing, in the RGB space, classification processing on each display unit included in the picture so as to obtain several color categories by classifying display units having same color characteristics in the RGB space into a same color category, and calculating a quantity of display units corresponding to each color category. The color characteristic is a value range of any dimension in the RGB space or a combination including at least value ranges of any two dimensions in the RGB space.

There may be multiple classification methods. As described above, a method of obtaining values in segments according to an interval range of at least one dimension of the first color space may be used. Preferably, downsampling may be performed on the display units in the picture by using the following Formula 1, to classify the display units:

$$[S'_1, S'_2, \ldots S'_T] = \left[\left\lfloor \frac{S_1}{2^{q1}} \right\rfloor, \left\lfloor \frac{S_2}{2^{q1}} \right\rfloor, \ldots, \left\lfloor \frac{S_T}{2^{q1}} \right\rfloor\right], \quad \text{(Formula 1)}$$

Display units that are obtained after downsampling and that have same $[S'_1, S'_2, \ldots S'_T]$ are classified into a same color category, where T is a quantity of dimensions of the first color space $[S_1, \ldots, S_T]$, is a value of a single display unit in the first color space, q1 is an integer greater than 0 and less than p, and a value of p may be obtained according to a known maximum value $2^p-1$ of each dimension in the first color space.

For example, the first color space is the RGB space, downsampling is performed, by using the following formula, on the display units included in the picture:

$$[S'_R, S'_G, S'_B] = \left[\left\lfloor \frac{S_R}{2^{q1}} \right\rfloor, \left\lfloor \frac{S_G}{2^{q1}} \right\rfloor, \left\lfloor \frac{S_T}{2^{q1}} \right\rfloor\right],$$

and display units that are obtained after downsampling and that have same $[S_R', S_G', S_B']$ are classified into a same color category.

$[S_R, S_G, S_B]$ is a value of a single display unit in the RGB space, q1 is an integer greater than 0 and less than p, and the value of p may be obtained according to the maximum value $2^p-1$ of each dimension in the RGB space.

For a further detailed explanation, the first color space is set as an RGB256 space (values of R, G, and B range from 0 to 255). It is assumed that a value of a display unit A in the picture is $[S_R,S_G,S_B]=[120, 56, 56]$ in the RGB space, and a value of another display unit B is $[S_R,S_G,S_B]=[124,50,60]$ in the RGB space. A downsampling is performed on the display units A and B by using the foregoing method. It may be determined that the value of p is 8 according to that a value of each dimension in the RGB space ranges from 0 to 255, that is, $2^p-1=255$. Therefore, it may be known that p=8, and a value of p1 is selected to be 4 (an integer greater than 0 and less than 8):

for the display unit A:

$$[S'_R, S'_G, S'_B] = \left[\left\lfloor \frac{120}{2^4} \right\rfloor, \left\lfloor \frac{56}{2^4} \right\rfloor, \left\lfloor \frac{56}{2^4} \right\rfloor\right] = [7, 3, 3],$$

and
for the display unit B:

$$[S'_R, S'_G, S'_B] = \left[\left\lfloor \frac{124}{2^4} \right\rfloor, \left\lfloor \frac{50}{2^4} \right\rfloor, \left\lfloor \frac{60}{2^4} \right\rfloor\right] = [7, 3, 3].$$

The two display units have equivalent $[S_R',S_G',S_B']$ obtained through downsampling, and therefore, are classified into a same color category.

Step S204, which is a color-weight calculation step, is performed for converting each color category from the first color space to the second color space, obtaining a value of each color category in each dimension of the second color space, determining a weighting function of each dimension of the second color space according to a factor that is in a display requirement and that corresponds to each dimension of the second color space, and calculating a weight of each color category according to the value of each color category in each dimension of the second color space and the weighting function of each dimension.

The second color space is usually color space different from the first color space. For example, the first color space is an RGB space or LAB space, and the second color space may be an HSV space, HIS space, or YUV space. The HSV space is three-dimensional color space and has three dimensions: hue H, saturation rate S, and brightness V. In the HSI space, a combination of three dimensions H, S, and I is used to represent a color. H defines a wavelength color tone (that is, a color tone) of a color, S represents a degree of darkness (that is, the saturation rate) of a color, and I represents intensity or brightness. In the YUV space, Y represents brightness (that is, a grayscale). U and V represent chrominance, express color tone or a saturation rate of a color, and form two components of a color.

The first color space may be converted to the second color space by using a known color space conversion algorithm. For example, when an RGB space is converted to an HSV space, an OpenCv crypto library may be used. This is not limited in the present invention.

The display requirement may be diversified. For example, the display requirement may include one or more factors. For example, a color of a picture is relatively bright, or an extreme color such as blood red is avoided being seen, or an extreme color unfavorable to text display is avoided. When a picture is displayed, there may be a display requirement only having a single factor, or there may be a display requirement having multiple factors.

An example in which the second color space is the HSV space is used. The HSV space is three-dimensional space, and has three dimensions: hue H, saturation rate S, and lightness V. If the display requirement includes a factor that a color of a picture is relatively bright, and the factor corresponds to the saturation rate S of the HSV space, a weighting function of the saturation rate needs to be set. For another example, if the display requirement includes a factor that an extreme color such as blood red does not show up in a picture, and the factor corresponds to the hue H of the HSV space, a weighting function of the hue needs to be set. For another example, if the display requirement includes a factor of avoiding an extreme color unfavorable to text display, and the factor corresponds to the lightness V of the HSV space, a weighting function of the lightness needs to be set.

Further, if the display requirement includes the factor that a color of a picture is relatively bright, the weighting function of the saturation rate S needs to be set. The weighting function of the saturation rate may be set to a quadratic function of the saturation rate value S, so that the factor, included in the display requirement, that a color of a picture is relatively bright can be highlighted in a result value calculated by the saturation rate function. For another example, if the display requirement includes a factor that a color of a picture is relatively soft, the weighting function of the saturation rate S needs to be set. The weighting function of the saturation rate may be set to a linear function or a constant term of the saturation rate value S, so that the factor, included in the display requirement, that a color of a picture is relatively soft can be highlighted in a result value calculated by the saturation rate function. For another example, the display requirement includes the factor that an extreme color such as blood red does not show up in a picture. The factor corresponds to the hue H of the HSV space, and the factor requires that a color falling within a value range of H corresponding to blood red cannot be the dominant color. The weighting function of the hue needs to be set, so that blood red can be removed from a result value calculated by the weighting function of the hue. For another example, if the display requirement includes the factor of avoiding an extreme color unfavorable to text display, and the factor corresponds to the lightness V of the HSV space, the weighting function of the lightness V needs to be set. The weighting function of the lightness may be set to a linear function, so that an extreme color unfavorable to text display may be avoided in a result value calculated by the weighting function of the lightness. The foregoing examples are merely exemplary. The present invention is not limited thereto. A person skilled in the art may change, according to an actual application scenario or need, the method for implementing the present invention.

Preferably, the N color categories obtained in step S203 are converted from the first color space to the second color space having M dimensions, to obtain a value of each color category in the second color space, where an $i^{th}$ color category in a $j^{th}$ dimension of the second color space is $P_{ij}$ (i=1, ..., N; j=1, ..., M). The weighting function of each dimension of the second color space is set according to the factor that is in the display requirement and that corresponds to each dimension of the second color space, where a weighting function of the $j^{th}$ dimension is $F(x_j)$ (j=1, ..., N). Then, the weight of each color category is calculated according to the value and the weighting function of each color category in the second color space, where a weight $W_i$ of the $i^{th}$ category of color is:

$$W_i = \sum_{j=1}^{M} F(P_{ij}) + C \qquad \text{(Formula 2)}$$

where C is a constant except 0.

A value of C may be selected according to an application need or practice experience. For example, C=1.

An example in which the first color space is an RGB space, and the second color space is HSV space is used for further description. Each color category obtained through classification in the RGB space is converted from the RGB space to the HSV space. The HSV space is a three-dimensional color space. In this example, a value range of H space (hue of a color) is [0, 179], which represents a color circle; a value range of S space (color saturation rate) is [0, 255], where a larger value indicates a higher saturation rate; and a value range of V space (color lightness) is [0, 255], where a larger value indicates higher lightness.

The N color categories obtained through classification in step S203 are converted from the RGB space to the HSV space having three dimensions, to obtain values of each color category in hue H, saturation rate S, and lightness V of the HSV space, where a value of an $i^{th}$ color category is [$H_i$, $S_i$, $V_i$]. A weighting function of each dimension of the HSV space is set according to a factor that is in the display requirement and that corresponds to each dimension of the HSV space, where a weighting function of the hue is F(H), a weighting function of the saturation rate is F(S), and a weighting function of the lightness is F(V). A weight of each color category is calculated according to the value of each color category in the HSV space and the weighting function, where a weight $W_i$ of the $i^{th}$ color category is:

$$W_i = F(H_i) + F(S_i) + F(V_i) + C \qquad \text{(Formula 3)}$$

where C is a constant except 0.

A value of C may be selected according to an application need or practice experience. For example, C=1.

Preferably, the weighting function is set so that a dimension having a higher correlation with a factor in the display requirement indicates a larger result value calculated by the weighting function of the dimension.

An example in which the second color space is the HSV space is used. The display requirement includes the factor that a color of a picture is relatively bright, and among the hue H, the saturation rate S, and the lightness V in the HSV space, the saturation rate S has a highest correlation with the factor. Therefore, the weighting function of the saturation rate may be set to a quadratic function of the saturation rate value S, and the weighting function of the hue and the weighting function of the lightness may be set to monomial terms, constant terms, or even 0, so that a result value calculated by the weighting function of the saturation rate is greater than a result value calculated by the weighting function of the hue and a result value calculated by the weighting function of the lightness.

For another example, the display requirement includes the factor of avoiding an extreme color unfavorable to text display, and among the hue H, the saturation rate S, and the lightness V in the HSV space, the lightness V has a highest correlation with the factor. Therefore, the weighting function of the lightness may be set to a linear function of the lightness value V, and the weighting function of the hue and the weighting function of the saturation rate may be set to monomial terms, constant terms, or even 0, so that a result value calculated by the weighting function of the lightness is greater than a result value calculated by the weighting function of the hue and a result value calculated by the weighting function of the saturation.

The foregoing examples are merely exemplary. The present invention is not limited thereto. A person skilled in the art may change, according to an actual application scenario or need, the method for implementing the present invention.

Preferably, when the factor corresponding to the saturation rate of the HSV space in the display requirement is making a displayed color brighter, the weighting function of the saturation rate is set to:

$$F(S)=(S/2^A)^2 \quad \text{(Formula 4)}$$

where S is a value of the saturation rate, and A is a positive integer.

For example, it is selected, according to application experience, that A=3. The weighting function of the saturation rate is $F(S)=(S/8)^2$ according to formula 4.

In addition, the factor of making a displayed color brighter in the display requirement has a relatively high corresponding correlation with the saturation rate of the HSV space, that is, higher than corresponding correlations with the hue H and the lightness V in the display requirement. F(H) and F(V) may be set to monomial terms or constant terms, so that a result value calculated by F(S) is relatively large.

For example, in some applications, if there is no factor corresponding to the hue and the lightness in the display requirement, and there is only the factor corresponding to the saturation rate and that is making a displayed color brighter, F(H) and F(V) are set to 0. According to Formula 3 and Formula 4, the weight $W_i$ of the $i^{th}$ color category is $W_i=(S_i/A)^2+C$, where $S_i$ is a saturation rate value of the $i^{th}$ category of color, and C is a constant except 0.

Preferably, when a factor corresponding to the lightness of the HSV space in the display requirement is avoiding an extreme color unfavorable to text display, a weighting function of the lightness is set to:

$$F(V) = \begin{cases} V & V < 2^{p2-1} \\ 2^{p2-1} & 2^{p2-1} \le V \le 2^{p2-2} \times 3 \\ 2^{p2+1} - 2 \times V & V > 2^{p2-1} \end{cases} \quad \text{(Formula 5)}$$

where V is a value of the lightness, and a value of p2 is obtained according to a maximum value $2^{p2}-1$ of the value V of the lightness of the HSV space.

For example, the maximum value of the lightness V in the HSV space in the example is 255, that is, $2^{p2}-1=255$. Correspondingly, p2=8. According to formula 5, the weighting function of the lightness is:

$$F(V) = \begin{cases} V & V < 128 \\ 128 & 128 \le V \le 192 \\ 512 - 2 \times V & V > 128 \end{cases}$$

In addition, for the factor of an extreme color unfavorable to text display in the display requirement, a correlation corresponding to the lightness of the HSV space is higher, that is, higher than correlations corresponding to the hue H and the saturation rate S in the display requirement. F(H) and F(S) may be set to monomial terms or constant terms, so that a result value calculated by F(S) is larger.

For example, in some applications, if there is no factor corresponding to the hue and the saturation rate in the display requirement, and there is merely a factor corresponding to the lightness, F(H) and F(S) are set to 0. According to Formula 3 and Formula 5, the weight $W_i$ of $i^{th}$ color category is:

$$W_i = \begin{cases} V_i + C & V_i < 2^{p2-1} \\ 2^{p2-1} + C & 2^{p2-1} \le V_i \le 2^{p2-2} \times 3 \\ 2^{p2+1} - 2 \times V_i + C & V_i > 2^{p2-1} \end{cases},$$

where $V_i$ is the value of the lightness of the $i^{th}$ color category.

Subsequently, step S205, which is a dominant-color extraction step, is performed for calculating color values according to the quantity of display units corresponding to each color category and the weight of the color category, and extracting a color category having a highest color value to serve as the dominant color of the picture.

In the present invention, the color value represents an evaluation on each color category, and is comprehensively determined according to the weight of each color category that is obtained by using the display requirement and the quantity of display units corresponding to each color category. Among the colors that satisfy the display requirement, a color having a largest color value is a color that includes a largest quantity of display units (that is, the quantity of corresponding display units) in the picture. Therefore, the category of color serves as the dominant color of the picture.

The color value is calculated according to the quantity of display units corresponding to each color category and the weight of the color category. The color value may be a value obtained by simply multiplying the quantity of display units corresponding to each color category by the weight of the color category, or may be a value obtained by multiplying the quantity of display units corresponding to each color category by the weight of the color category and then multiplying or dividing a proportionality coefficient. The proportionality coefficient may be selected according to an application need or may be selected according to a processing capability of an apparatus for implementing calculation. Alternatively, another equivalent calculation method may be used, provided that a result of the color value of each color category obtained through calculation is an evaluation on each color category, that is based on a same evaluation criterion and that embodies the quantity of display units corresponding to each color category and the weight of each color category that is obtained according to the display requirement.

Preferably, the quantity of display units corresponding to each color category is multiplied by the weight to obtain a value as the color value of each color category.

More preferably, an intermediate color value of a color category that has a largest color value is extracted to serve as the dominant color of the picture.

The intermediate color value of the color category that has the largest color value may be a color value corresponding to a display unit in a middle position obtained after value sorting or another sorting method is performed on the quantity of display units corresponding to the color category that has the largest color value.

Optionally, step S206, which is a step of matching a template to determine a final dominant color, is performed for matching the extracted dominant color of the picture with a pre-configured template color, and selecting a template color nearest to the dominant color of the picture as the final output dominant color of the picture.

If there is a problem, for example, the extracted dominant color of the picture is not beautiful or the display requirement is not completely satisfied after step S205, step S206 may be performed to match the dominant color of the picture with a template and select a template color nearest to the dominant color of the picture as the final dominant color of the picture, so that the finally output dominant color of the picture satisfies user aesthetics or completely satisfies the display requirement.

The pre-configured template color may be selected according to the display requirement. For example, a color set having good user experience is selected to be the template color. Dazzling blood red is not included. For an algorithm of matching the dominant color of the picture with the template color, a method for calculating color similarity that is proposed by John R. Smith and Shih-Fu Chang in "a fully automated content-based image query system" may be used.

If there is no such problem, for example, the extracted dominant color of the picture is not beautiful or the display requirement is not satisfied after step S205, the extracted dominant color of the picture obtained after step S205 is the final output dominant color of the picture, and step S206 does not need to be performed.

In conclusion, in the method for extracting a dominant color of a picture provided in the present invention, color classification and a color weight are used, and a pre-configured template color is auxiliary used for complement. Therefore, a dominant color of a picture may be obtained more accurately.

Figure 4:
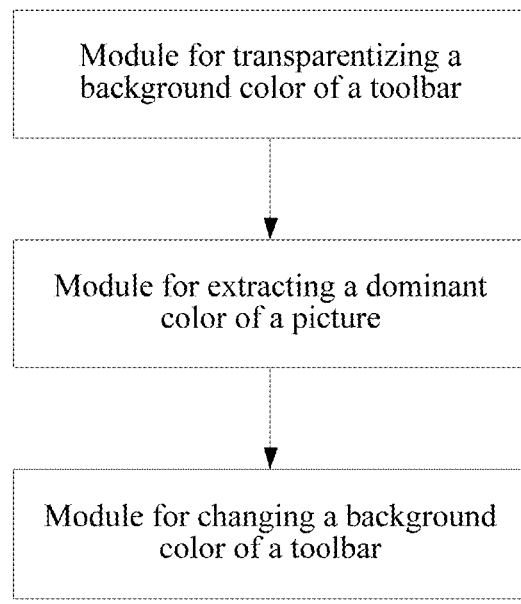
FIG. 4 is a block diagram of an apparatus for changing a background color of a toolbar with a dominant color of a picture according to the present invention.

FIG. 4 is a block diagram of an apparatus for changing a background color of a toolbar with a dominant color of a picture according to the present invention. The apparatus may be configured to implement the method shown in FIG. 1. Therefore, a repeated part is not described in detail again. As shown in FIG. 4, the apparatus for changing a background color of a toolbar with a dominant color of a picture includes:

a module for transparentizing a background color of a toolbar, configured to transparentize a background color of a toolbar of a currently running application;

a module for extracting a dominant color of a picture, configured to extract a dominant color of a picture currently displayed on a user interface of the application; and a module for changing a background color of a toolbar, configured to: use the extracted color as the background color of the toolbar, and display the extracted color.

In addition, in a preferable solution, the apparatus for changing a background color of a toolbar with a dominant color of a picture may further include:

a module for changing a button color of a toolbar, configured to automatically change a button color of the toolbar according to the changed background color of the toolbar. An implementation principle of the function is already described in detail in the process of describing step 4, and is not described herein again.

In addition, in another preferable solution, the apparatus for changing a background color of a toolbar with a dominant color of a picture may further include:

a module for recovering a background color of a toolbar, configured to recover the background color of the toolbar to a default color when the displayed picture is completely moved out of an operation interface and the operation interface does not have a picture or a color to display.

By means of the apparatus for changing a background color of a toolbar with a dominant color of a picture described in the present invention, an extracted dominant color of a picture may be applied to a conventionally fixed background color of a toolbar, so that a color of the toolbar may be adaptively adjusted according to result content displayed on a screen. Therefore, an interface match is more harmonious and beautiful. Overall harmony and a subject correlation of the interface are enhanced. Disadvantages of a relatively rigid overall look and a relatively strong sense of being cut apart of the display interface in the prior art are avoided. An effect of interface immersive experience is improved, and the interface is more visually harmonious.

In addition, although the apparatus for changing a background color of a toolbar with a dominant color of a picture is described in multiple embodiments described above, a person skilled in the art knows that an apparatus for changing a background color of another element bar with a dominant color of a picture may be designed based on the idea. The another element bar includes, but is not limited to: a title bar, a menu bar, an address bar, a status bar, a taskbar, a browsing bar, or the like.

Therefore, an embodiment of the present invention further provides an apparatus for changing a background color of an element bar with a dominant color of a picture, including:

a module for transparentizing a background color of an element bar, configured to transparentize a background color of an element bar of a currently running application;

a module for extracting a dominant color of a picture, configured to extract a dominant color of a picture currently displayed on a user interface of the application; and a module for changing a background color of an element bar, configured to use the extracted color as the background color of the element bar and display the extracted color.

Preferably, the apparatus further includes: a module for changing a button color of an element bar, configured to automatically change a button color of the element bar according to the changed background color of the element bar. The element bar includes: a title bar, a menu bar, a toolbar, an address bar, a status bar, a taskbar, or a browsing bar.

In addition, any combination solution of multiple embodiments described above is also applicable to this embodiment.

Figure 5:
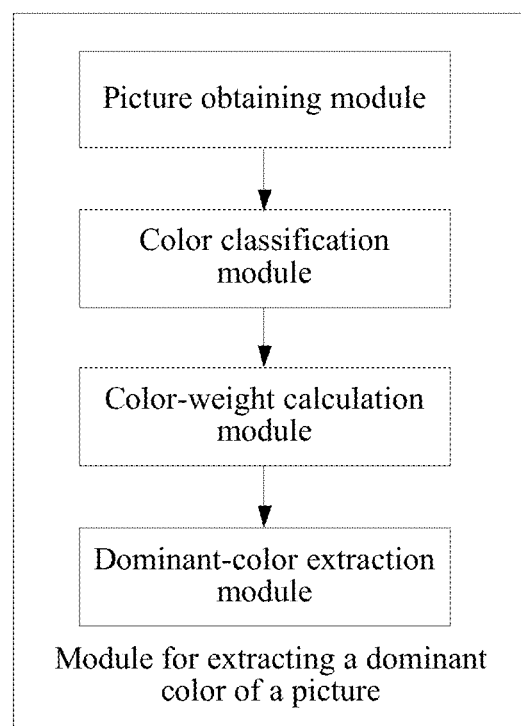
FIG. 5 is a block diagram of a module for extracting a dominant color of a picture according to an embodiment of the present invention.

FIG. 5 is a block diagram of a module for extracting a dominant color of a picture according to an embodiment of the present invention. The module for extracting a dominant color of a picture may be configured to implement the method shown in FIG. 2. Therefore, a repeated part is not described in detail again. As shown in FIG. 5, the module for extracting a dominant color of a picture in the present invention includes:

a picture obtaining module, configured to obtain the currently displayed picture, where the picture includes multiple display units;

a color classification module, configured to: perform, in first color space, classification processing on each display unit included in the picture so as to obtain several color categories by classifying display units having same color characteristics into a same color category, and calculate a quantity of display units corresponding to each color category;

a color-weight calculation module, configured to: convert each color category from the first color space to second color space, obtain a value of each color category in each dimension of the second color space, determine a weighting function of each dimension of the second color space according to a factor that is in a display requirement and that corresponds to each dimension of the second color space, and calculate a weight of each color category according to the value of each color category in each dimension of the second color space and the weighting function of each dimension; and a dominant-color extraction module, configured to: calculate color values according to the quantity of display units corresponding to each color category and the weight of the color category, and extract a color category having a highest color value to serve as the dominant color of the picture.

Figure 6:
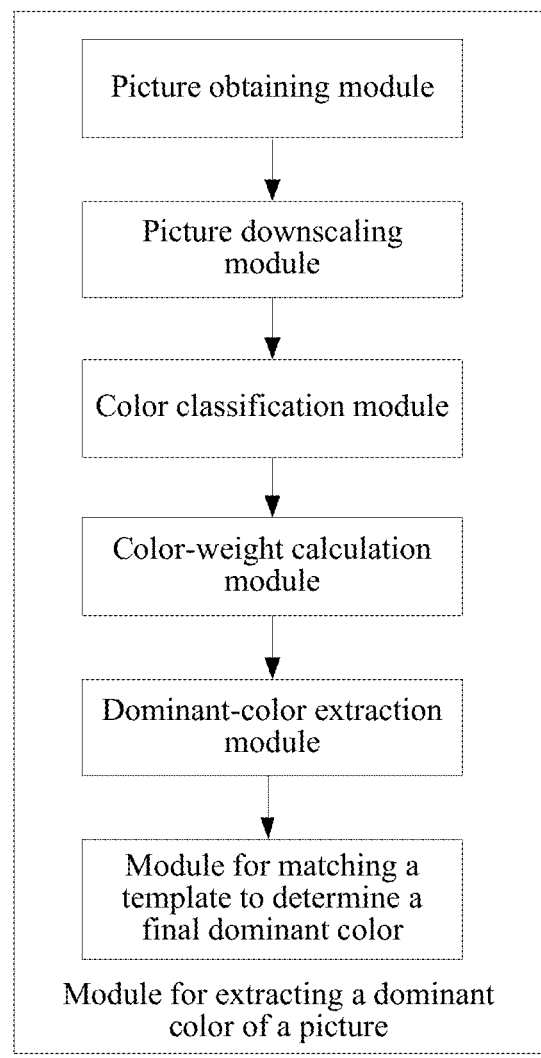
FIG. 6 is a block diagram of a module for extracting a dominant color of a picture according to another embodiment of the present invention.

FIG. 6 is a block diagram of a module for extracting a dominant color of a picture according to another embodiment of the present invention. The module shown in FIG. 6 may be configured to implement the method shown in FIG. 3. Therefore, a repeated part is not described in detail again. As shown in FIG. 6, preferably, the module for extracting a dominant color of a picture in the present invention may further include: a picture downscaling module and/or a module for matching a template to determine a final dominant color.

The picture downscaling module is configured to reduce side pixels of the picture to a proper value.

The module for matching a template to determine a final dominant color is configured to: match the extracted dominant color of the picture with a pre-configured template color, and select a template color nearest to the dominant color of the picture as the final dominant color of the picture.

Preferably, the color classification module is configured to: perform, by using the following formula, downsampling on the display units included in the picture:

$$[S'_1, S'_2, \ldots S'_T] = \left[\left\lfloor\frac{S_1}{2^{q1}}\right\rfloor, \left\lfloor\frac{S_2}{2^{q1}}\right\rfloor, \ldots, \left\lfloor\frac{S_T}{2^{q1}}\right\rfloor\right],$$

and classify display units that are obtained after downsampling and that have same $[S_1', S_2', \ldots S_T']$ into a same color category, where T is a quantity of dimensions of the first color space $[S_1, \ldots, S_T]$ is a value of a single display unit in the first color space, q1 is an integer greater than 0 and less than p, and a value of p is obtained according to a known maximum value $2^p-1$ of each dimension in the first color space.

Preferably, the color-weight calculation module is configured to:

convert color categories obtained after classification from the first color space to the second color space having M dimensions to obtain a value of each color category in the second color space, where a value of an $i^{th}$ color category in a $j^{th}$ dimension of the second color space is $P_{ij}(i=1, \ldots, N; j=1, \ldots, M)$;

set the weighting function of each dimension of the second color space according to the factor that is in the display requirement and that corresponds to each dimension of the second color space, where a weighting function of the $j^{th}$ dimension is $F(x_j)(j=1 \ldots, N)$; and calculate the weight of each color category according to the value and the weighting function of each color category in the second color space, where a weight i of the $W_{i^{th}}$ category of color is $$W_i = \sum_{j=1}^{M} F(P_{ij}) + C,$$

where C is a constant except 0.

Preferably, the color-weight calculation module is configured to set the weighting function so that a dimension having a higher correlation with a factor in the display requirement indicates a larger result value calculated by the weighting function of the dimension.

Preferably, the first color space is different from the second color space.

Preferably, when the second color space is an HSV space, the color-weight calculation module is configured to: when a factor corresponding to a saturation rate of the HSV space in the display requirement is making a displayed color brighter, set a weighting function of the saturation rate to $F(S)=(S/2^A)^2$, where S is a value of the saturation rate, and A is a positive integer.

Preferably, when the second color space is the HSV space, the color-weight calculation module is configured to: when a factor corresponding to the lightness of the HSV space in the display requirement is avoiding an extreme color unfavorable to text display, set a weighting function of the lightness to:

$$F(V) = \begin{cases} V & V < 2^{p2-1} \\ 2^{p2-1} & 2^{p2-1} \leq V \leq 2^{p2-2} \times 3 \\ 2^{p2+1} - 2 \times V & V > 2^{p2-1} \end{cases},$$

where V is a value of the lightness, and a value of p2 is obtained according to a maximum value $2^{p2}-1$ of the value V of the lightness of the HSV space.

Preferably, the dominant-color extraction module is configured to multiply the quantity of display units corresponding to each color category by the weight to obtain a color value of each color category.

More preferably, the dominant-color extraction module is further configured to extract an intermediate color value of a color category that has a largest color value to serve as the dominant color of the picture.

In conclusion, in the apparatus for extracting a dominant color of a picture provided in the present invention, color classification and a color weight are used, and a pre-configured template color is auxiliary used for complement. Therefore, a dominant color of a picture may be obtained more accurately.

It may be clearly understood by a person skilled in the art that, for the purpose of convenient and brief description, for a detailed working process of the foregoing apparatus, refer to a corresponding process in the foregoing method embodiments, and details are not described herein again.

A computer program product of the method for changing a background color of a toolbar with a dominant color of a picture provided in this embodiment of the present invention includes a computer-readable storage medium storing program code. An instruction included in the program code may be used to execute the method described in the foregoing embodiments. For specific implementation, refer to the method embodiments, and details are not described herein again.

When the functions are implemented in the form of a software functional unit and are sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing computer-readable storage medium includes a U disk, a mobile hard disk, a read-only memory (ROM), a random access memory (RAM), a magnetic disk, or an optical disc, or any other medium that can be used for storing program code.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A computer-based method for changing a background color of a toolbar in accordance with a dominant color of a picture, comprising:
   transparentizing, based on an instruction included in program code executed by a computing device, a background color of a toolbar of a currently running application;
   extracting, based on an instruction included in program code executed by the computing device, a dominant color of a picture currently displayed on a user interface of the application;
   displaying, based on an instruction included in program code executed by the computing device, the toolbar using a color based on the extracted dominant color as the background color of the toolbar, along with the picture on the user interface of the application, such that the toolbar and the picture are displayed harmoniously; and
   when the displayed picture is moved up and down or left and right with a user operation, keeping the background color of the toolbar unchanged from the color based on the extracted dominant color when the displayed picture is not completely moved out of an operation interface; and recovering the background color of the toolbar to a default color when the displayed picture is completely moved out of the operation interface and the operation interface does not have a picture or a color to display.

2. The method according to claim 1, further comprising:
   automatically changing a button color of the toolbar displayed using the color based on the extracted dominant color as the background color, according to the changed background color of the toolbar.

3. The method according to claim 2, wherein the button color of the toolbar is automatically changed by using a color-to-grayscale method, wherein the color-to-grayscale method comprises:
   using a formula Gray=R*0.299+G*0.587+B*0.114, wherein Gray is a grayscale value, R is a red color value of the extracted dominant color of the picture, G is a green color value of the extracted dominant color of the picture, and B is a blue color value of the extracted dominant color of the picture; and converting the RGB color values of the extracted dominant color of the picture to a grayscale value, wherein when the grayscale value ranges from 0 to 0.5, the button color of the toolbar is changed to black, and when the grayscale value ranges from 0.5 to 1, the button color of the toolbar is changed to white.

4. The method according to claim 1, wherein the extracting a dominant color of a currently displayed picture comprises:
   a picture obtaining step for obtaining the currently displayed picture, wherein the picture comprises multiple display units;
   a color classification step for performing, in a first color space, classification processing on each display unit comprised in the picture so as to obtain several color categories by classifying display units having same color characteristics into a same color category, and calculating a quantity of display units corresponding to each color category;
   a color-weight calculation step for converting each color category from the first color space to a second color space, obtaining a value of each color category in each dimension of the second color space, determining a weighting function of each dimension of the second color space according to a factor that is in a display requirement and that corresponds to each dimension of the second color space, and calculating a weight of each color category according to the value of each color category in each dimension of the second color space and the weighting function of each dimension; and
   a dominant-color extraction step for calculating color values according to the quantity of display units corresponding to each color category and the weight of the color category, and extracting a color category having a highest color value to serve as the dominant color of the picture.

5. The method according to claim 4, wherein the color-weight calculation step comprises:
   converting N color categories obtained after classification from the first color space to the second color space having M dimensions, to obtain a value of each color category in the second color space, wherein a value of an $i^{th}$ color category in a $j^{th}$ dimension of the second color space is expressed as $P_{ij}$(i=1, ..., N; j=1, ..., M);
   configuring the weighting function of each dimension of the second color space according to the factor that is in the display requirement and that corresponds to each dimension of the second color space, wherein a weighting function of the $j^{th}$ dimension is $F(x_j)$(j=1, ..., N); and
   calculating the weight of each color category according to the value and the weighting function of each color category in the second color space, wherein a weight $W_i$ of the $i^{th}$ category of color is $$W_i = \sum_{j=1}^{M} F(P_{ij}) + C,$$

wherein C is a constant except 0.

6. The method according to claim 4, wherein the weighting function is set so that a dimension with a higher correlation with a factor in the display requirement, associates with a larger result value calculated by the weighting function of the dimension.

7. The method according to claim 4, wherein the first color space is an RGB space, and the second color space is an HSV space.

8. The method according to claim 7, wherein in the color-weight calculation step, when a factor corresponding to a saturation rate of the HSV space in the display requirement is making a displayed color brighter, a weighting function of the saturation rate is set to $F(S)=(S/2^A)^2$, wherein S is a value of the saturation rate, and A is a positive integer.

9. The method according to claim 7, wherein in the color-weight calculation step, when a factor corresponding to lightness of the HSV space in the display requirement is avoiding an extreme color unfavorable to text display, a weighting function of the lightness is set to:

$$F(V) = \begin{cases} V & V < 2^{p2-1} \\ 2^{p2-1} & 2^{p2-1} \leq V \leq 2^{p2-2} \times 3, \\ 2^{p2+1} - 2 \times V & V > 2^{p2-1} \end{cases}$$

wherein V is a value of the lightness, and a value of p2 is obtained according to a maximum value $2^{p2}-1$ of the value V of the lightness of the HSV space.

10. The method according to claim 4, wherein the color classification step further comprises: performing, by using the following formula, downsampling on the display units comprised in the picture:

$$[S_1', S_2', \ldots S_T'] = \left[\left\lfloor \frac{S_1}{2^{q1}} \right\rfloor, \left\lfloor \frac{S_2}{2^{q1}} \right\rfloor, \ldots, \left\lfloor \frac{S_T}{2^{q1}} \right\rfloor\right],$$

and classifying display units that are obtained after downsampling and that have same $[S_1', S_2', \ldots S_T']$ into a same color category, wherein T is a quantity of dimensions of the first color space, $[S_1, \ldots, S_T]$ is a value of a single display unit in the first color space, q1 is an integer greater than 0 and less than p, and a value of p is obtained according to a known maximum value $2^p-1$ of each dimension in the first color space.

11. The method according to claim 4, wherein in the dominant-color extraction step, a color value of each color category is obtained by multiplying the quantity of display units corresponding to each color category by the weight.

12. The method according to claim 11, wherein the dominant-color extraction step comprises: extracting an intermediate color value of a color category that has a largest color value to serve as the dominant color of the picture.

13. The method according to claim 4, wherein before the color classification step, the method further comprises: a step of scaling down the picture, in order to reduce side pixels of the picture to a proper value.

14. The method according to claim 4, further comprising: a step of matching a template to determine a final dominant color for matching the extracted dominant color of the picture with a pre-configured template color, and selecting a template color nearest to the dominant color of the picture as the final dominant color of the picture.

15. An apparatus for changing a background color of a toolbar with a dominant color of a picture, comprising:
a computing device;
memory storing instructions, when executed by the computing device, configured to cause the computing device to:
transparentize a background color of a toolbar of a currently running application;
extract a dominant color of a picture currently displayed on a user interface of the application;
display, along with the picture, the toolbar using a color based on the extracted dominant color as the background color of the toolbar on the user interface of the application, such that the toolbar and the picture are displayed harmoniously; and
when the displayed picture is moved up and down or left and right with a user operation, keep the background color of the toolbar unchanged from the color based on the extracted dominant color when the displayed picture is not completely moved out of an operation interface; and recover the background color of the toolbar to a default color when the displayed picture is completely moved out of the operation interface and the operation interface does not have a picture or a color to display.

16. The apparatus according to claim 15, wherein the instructions are further configured to cause the computing device to automatically change a button color of the toolbar displayed using the color based on the extracted dominant color as the background color, according to the changed background color of the toolbar.

17. The apparatus according to claim 16, wherein the button color of the toolbar is automatically changed by using a color-to-grayscale method, wherein the color-to-grayscale method comprises:
using a formula Gray=R*0.299+G*0.587+B*0.114, wherein Gray is a grayscale value, R is a red color value of the extracted dominant color of the picture, G is a green color value of the extracted dominant color of the picture, and B is a blue color value of the extracted dominant color of the picture; and converting the RGB color values of the extracted dominant color of the picture to a grayscale value, wherein when the grayscale value ranges from 0 to 0.5, the button color of the toolbar is changed to black, and when the grayscale value ranges from 0.5 to 1, the button color of the toolbar is changed to white.

18. The apparatus according to claim 15, wherein the instructions are further configured to cause the computing device to recover the background color of the toolbar to a default color when the displayed picture is completely moved out of an operation interface and the operation interface does not have a picture or a color to display.

19. A computer-based method for changing a background color of an element bar in accordance with a dominant color of a picture, comprising:

transparentizing, based on an instruction included in program code executed by a computing device, a background color of an element bar of a currently running application;

extracting, based on an instruction included in program code executed by the computing device, a dominant color of a picture currently displayed on a user interface of the application;

displaying, based on an instruction included in program code executed by the computing device, the element bar using a color based on the extracted dominant color as the background color of the element bar, along with the picture on the user interface of the application, such that the element bar and the picture are displayed harmoniously; and when the displayed picture is moved up and down or left and right with a user operation, keeping the background color of the toolbar unchanged from the color based on the extracted dominant color when the displayed picture is not completely moved out of an operation interface; and recovering the background color of the toolbar to a default color when the displayed picture is completely moved out of the operation interface and the operation interface does not have a picture or a color to display.

* * * * *